2,679,983

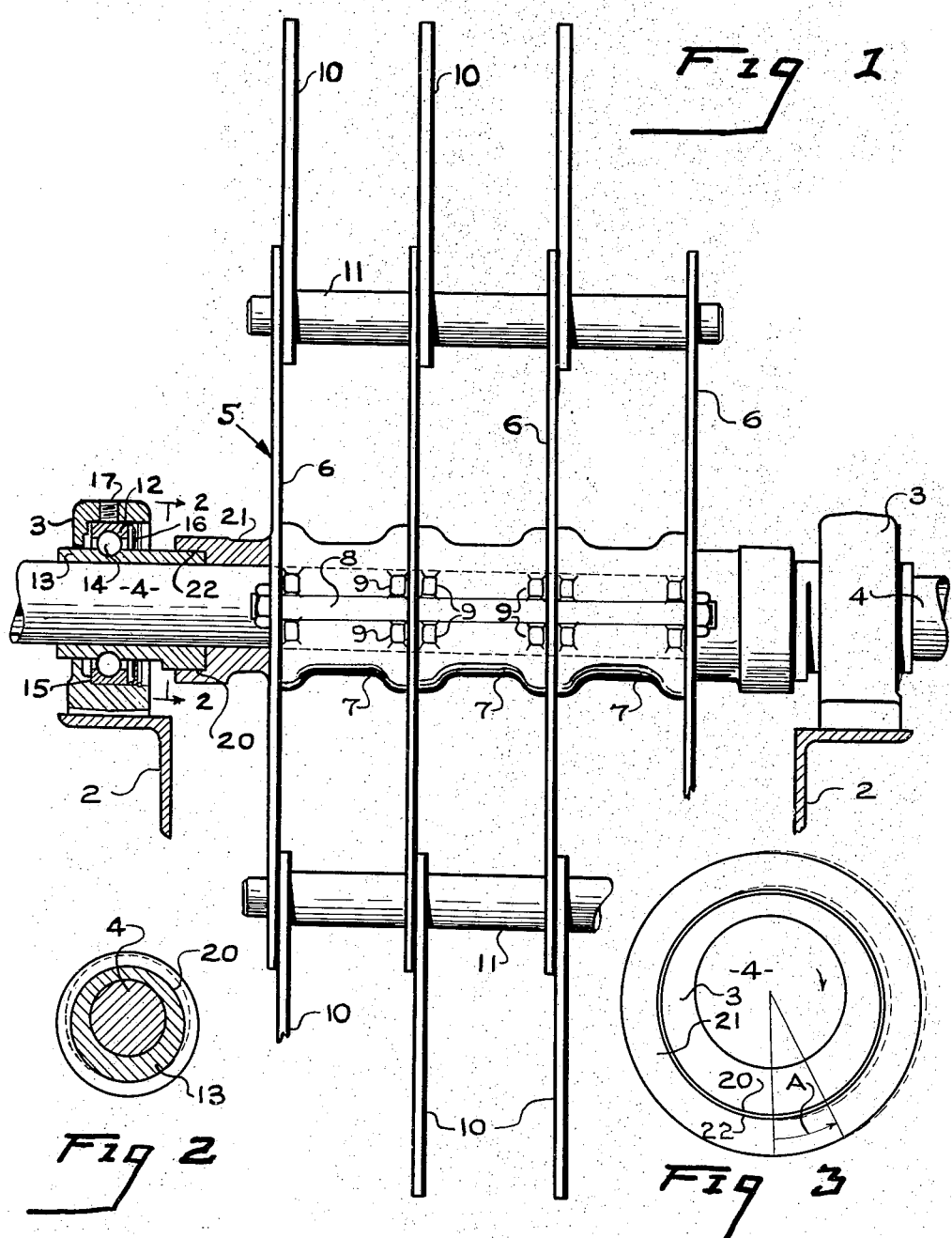
June 1, 1954
M. J. HAPPE
2,679,983
BEARING AND LOCKING MEANS FOR MOUNTING DRIVE
SHAFTS, AND FOR SECURING HAMMER MILL ROTORS
AGAINST DISPLACEMENT ON DRIVE SHAFTS
Filed Jan. 2, 1952
INVENTOR
Melvin J. Happe
BY Richard E. Babcock Jr.
ATTORNEY Patented June 1, 1954

UNITED STATES PATENT OFFICE 2,679,983

BEARING AND LOCKING MEANS FOR MOUNTING DRIVE SHAFTS, AND FOR SECURING HAMMER MILL ROTORS AGAINST DISPLACEMENT ON DRIVE SHAFTS

Melvin J. Happe, New Holland, Pa., assignor to The New Holland Machine Division of The Sperry Corporation, New Holland, Pa., a corporation of Delaware Application January 2, 1952, Serial No. 264,592

5 Claims. (Cl. 241—191)

This invention relates to a locking means for securing a driven element against rotational and axial displacement on a drive shaft, and particularly to such locking means which is adapted for incorporation in the shaft bearing means.

It is a primary object of the invention to provide such locking means or mechanism which avoids any necessity for mutilating or weakening of the drive shaft as by slotting for the reception of a key, or as is often caused by the use of set screws and the like. Such an arrangement constitutes an advantageous and economical simplification as compared to prior arrangements for the same general purpose, and due to avoidance of any mutilating or weakening of the shaft, permits the use of a relatively smaller and weaker shaft in many cases than might otherwise be required.

It is a further object to provide such a locking means which may advantageously be incorporated in a bearing structure, whereby assembly of the driven element and shaft with the bearing structure will also serve to assemble the drive shaft and the locking means in operative relation.

It is also an object to provide such an arrangement in which the locking means serves to fixedly axially position the bearings and driven element in proper predetermined relation on the shaft, and in addition locks the driven element against rotation relative to the shaft. In addition the invention permits a wide range of axial adjustment of the several parts on the drive shaft.

It is a still further object to provide such a locking arrangement which functions automatically to increase the locking grip thereof on the shaft in response to increased loads or forces on the driven element tending to cause slippage.

The foregoing as well as other incidental objects and advantages are attained by the preferred embodiment of the invention illustrated in the accompanying drawing, in which:

Figure 1 represents a front elevation, partly in section, of a hammer mill rotor and supporting shaft structure embodying my invention;

Figure 2, a section on the line 2—2 of Figure 1, looking in the direction of the arrows;

Figure 3, an enlarged diagrammatic view similar to Figure 2 but showing the several parts in relatively unlocked position, at the commencement of the assembling operation, and in dotted lines showing the several parts after they have been relatively rotated into locked position.

Referring now in detail to the accompanying drawings, the reference character 2 designates suitable angle iron or other frame members which serve as a means for supporting the relatively axially spaced bearings 3. Rotatably supported in the bearings 3, is a horizontal drive shaft 4 of usual round cross section, which carries any usual driven element, generally designated 5 for rotation therewith. In the present embodiment, the invention is illustrated as applied to a usual hammer mill rotor structure, such as is generally disclosed in the patent to Paul C. Dellinger et al. No. 2,276,940, of March 17, 1942. To this end, the driven element 5 is illustrated in the form of a hammer mill rotor which may comprise a plurality of plates 6 having central perforations receiving the shaft 4, the plates 6 being maintained in spaced radial planes on the shaft by means such as the tubular spacers 7 interposed between each adjacent pair of plates 6 on the shaft.

In order to secure the several parts of the rotor structure against relative rotary movement, I employ a plurality of bolts 8 extending axially through the several plates 6 and passing between opposed sets of relatively spaced lugs or bosses 9 formed on each of the tubular spacers or shaft sections 7. While only the front or forwardly presented bolt 8 is shown in Figure 1, it will be appreciated that a similarly arranged bolt 8 is disposed in similar manner on the rear side of the rotor structure shown. Suitable hammers 10 may be pivotally carried adjacent the outer periphery of the rotor structure, as by means of the rods or pivotal elements 11 extending through the respective plates 6 adjacent their outer edge portions. The bearings 3, which are preferably identical, each comprises an annular outer race 12 and an inner race or race sleeve 13, a series of usual roller balls 14 being operatively disposed between these races 12 and 13 in usual manner. Axial movement of the outer race 12 is limited by engagement thereof with the shoulder 15 of the bearing block or housing. Preferably the bearing structure also includes a conventional dust seal 16 and lubricating fitting 17 communicating with the interior of the bearing housing.

Preferably the inner ball race sleeve 13 is employed as one of the cooperating locking elements of the invention. To this end, the sleeve 13 includes an axially projecting end portion having an external, preferably cylindrical, cam surface 20 eccentric to the bore which receives the shaft 4, as will be readily apparent from one of the Figures 1, 2 or 3 of the drawings.

A cooperating cam element such as the collar 21 welded or otherwise fixed to and carried by the rotor is also formed with a cam surface 22 which is preferably cylindrical and also eccentric to the axis of the shaft 4. In this instance the cam face 22 constitutes the inner surface or face of a blind cylindrical bore extending into the end of the collar 21. The bore 22 is sufficiently larger than the eccentric cam portion 20 of the sleeve 13 as to freely loosely receive the cam portion 20 and to permit a partial rotation of said portion 20 as indicated in Figure 3, so that the coaction of the two cam surfaces 20 and 22 responsive to relative rotary movement thereof will urge their respective members 13 and 21 in opposite transverse directions into firm locking engagement with the shaft 4.

In order to assemble such a structure, the two bearings 3—3 and the rotor 5 may all be slid into position axially along the shaft 4, the bearings being disposed on opposite sides of the rotor and closely adjacent thereto, whereupon the bearing sleeves 13 respectively may be manually positioned to bring their eccentric portions 22 respectively into concentric registering relation with the eccentric sockets or bores 20 in the collars or cam elements 21 of the rotor 5. The bearings may then be moved axially to dispose the cam portions 20 in their respective sockets 22, whereupon the bearing housings may be then secured in fixed position on their respective supporting frame members 2. At this stage, the shaft 4 still remains freely axially slideable through the other assembled parts and may be easily manually adjusted to any desired axial position. When the desired position is reached, each set of cooperating bearing collar 21 and bearing sleeve 13 are partially rotated relative to each, as indicated by the arrow "A" in Figure 3, so that the inwardly directed cam face of the collar 21 is moved relative to the cam surface 20, from a position concentric thereto as indicated in full lines in Figure 3, to the position indicated in dotted lines in said figure, wherein the cam surfaces of the two cam elements 13 and 21 respectively tend to urge these two members transversely in opposite directions across the axis of the shaft 4 and thus into frictional gripping engagement on opposite sides of the shaft 4.

Preferably the direction of rotation of the rotor 5 utilized to cause the locking engagement of the two cam elements 13 and 21 with the shaft 4, as indicated by the arrow "A" in Figure 3, is in a direction opposite to that in which the shaft 4 and rotor 5 will normally rotate in operation. In such event, it will be seen that the inertia of the rotor 5 will in itself tend to tighten or increase the locking action as the rotation of the shaft is commenced, and as loads are imposed on the rotor 5 during operation these will tend to increase the locking engagement automatically in accordance with the amount of load or resistance to rotation imposed on the rotor.

From the foregoing it will be understood that the locking means of the invention serves to fixedly axially position the bearings and driven element or rotor 5 in proper predetermined relation on the shaft 4, and in addition locks the driven element against rotation relative to the shaft.

While it is not essential that the cam portion or element 20 be formed as an integral part of or connected to the bearing sleeve 13 as in the preferred embodiment of the invention, but same may in some instances be formed as a separate and entirely independent locking element, it will be apparent that its incorporation as a part of the bearing structure permits simultaneous assembly of both the bearing and the locking means on the shaft 4 as a part of the same operation.

In this application I have shown and described only the preferred embodiment of my invention as by law required. However, I recognize that the invention is capable of other and different embodiments, and that the several details may be varied in different respects, all without departing from the invention; therefore the drawings and description herein are to be construed as merely illustrative in nature and not as exclusive.

Having thus described my invention I claim:

1. A self-locking bearing for a hammer mill comprising a drive shaft and relatively axially spaced bearings rotatably supporting said shaft, each said bearing including an outer annular ball race and an inner ball race sleeve, said sleeve having a bore therethrough coaxially receiving said shaft and an axially projecting end having an external cylindrical surface eccentric to said bore, and a hammer mill rotor coaxially mounted on said shaft between said sleeves, collars fixedly carried by said rotor, each having a counterbore eccentric to said drive shaft loosely receiving one of said eccentric cylindrical surfaces, whereby relative rotary movement between said rotor and said sleeves and the resulting cam action between said sleeves and said collars will jam said sleeves and said collars respectively into locking relation against opposite sides of the shaft.

2. The combination defined in claim 1, in which the said eccentric counterbore of each said collar is blind, and the end of each said sleeve abuts against the end of its respective counterbore to resist axial thrusting forces tending to urge the shaft toward either of said bearings, such thrusting forces being transmitted through the sleeves and balls to their respective outer ball races.

3. The combination comprising a bearing, a drive shaft rotatably supported in said bearing, said bearing including an outer ball race, an inner rotatable ball race sleeve, and balls operatively disposed between said races and said sleeve, said sleeve being formed with an axial bore receiving said drive shaft, a hammer mill rotor coaxially mounted on said shaft adjacent said sleeve, and cooperating cam elements carried by said sleeve and said rotor respectively to jam said sleeve and said rotor transversely into frictional locking engagement with opposite sides of said shaft.

4. The combination comprising a drive shaft, a bearing sleeve coaxially rotatably receiving said shaft, a driven element normally freely rotatable on said shaft, said element being of substantially greater diameter and having a substantially greater rotational inertia than said bearing sleeve, and interengaging radially presented cam surfaces fixedly carried by said sleeve and said element respectively eccentrically to said shaft, whereby relative rotation between said surfaces will urge said sleeve and said element in opposite diametric directions into binding engagement with said shaft, the difference in inertia between said sleeve and said element tending to produce such relative rotation and binding engagement responsive to changes in rotational speed of the shaft.

5. The combination comprising a shaft, a hammer mill rotor rotatable thereon, a cam element fixed to said rotor and having a cam surface eccentric to said shaft, a cooperating cam element journalled on said shaft having a cam surface eccentric to said shaft in operative engagement with the cam surface of said first cam element, whereby relative rotary movement of said cam elements about said shaft will cause said elements to bind against said shaft in opposite diametrical directions, whereby the said rotor may be caused to rotate with said shaft, such binding being increased responsive to increased loads on said rotor tending to rotate it and the cam element fixed thereto relative to said cooperating cam element.

References Cited in the file of this patent

UNITED STATES PATENTS

| Number | Name | Date |
|---|---|---|
| 827,267 | Schmidt | July 31, 1906 |
| 1,561,443 | Searles | Nov. 10, 1925 |
| 1,713,507 | Ammon | May 21, 1929 |
| 2,273,379 | Searles | Feb. 17, 1942 |
| 2,424,316 | Johnston | July 22, 1947 |

FOREIGN PATENTS

| Number | Country | Date |
|---|---|---|
| 718,028 | France | Oct. 27, 1931 |